US008241466B2

(12) United States Patent
Noro et al.

(10) Patent No.: US 8,241,466 B2
(45) Date of Patent: Aug. 14, 2012

(54) DISTILLATION APPARATUS

(75) Inventors: Masaru Noro, Kyoto (JP); Katsuhito Nakagawa, Otsu (JP)

(73) Assignees: Sanyo Electric Co., Ltd., Osaka (JP); Sanyo Electric Techno Create Co., Ltd., Osaka (JP)

( * ) Notice: Subject to any disclaimer, the term of this patent is extended or adjusted under 35 U.S.C. 154(b) by 869 days.

(21) Appl. No.: 12/308,682

(22) PCT Filed: Mar. 12, 2007

(86) PCT No.: PCT/JP2007/000199
§ 371 (c)(1),
(2), (4) Date: Dec. 22, 2008

(87) PCT Pub. No.: WO2008/026301
PCT Pub. Date: Mar. 6, 2008

(65) Prior Publication Data
US 2009/0283398 A1    Nov. 19, 2009

(30) Foreign Application Priority Data

Aug. 31, 2006  (JP) .................................. 2006-235860

(51) Int. Cl.
*B01D 3/00* (2006.01)
*D06F 33/00* (2006.01)
(52) U.S. Cl. .................. 202/232; 68/12.08; 68/18 C
(58) Field of Classification Search .............. 165/60, 165/293, DIG. 348, DIG. 406, DIG. 223, 165/DIG. 217, DIG. 187; 202/185.1, 185.4, 202/185.5, 185.6; 68/12.08, 18 C
See application file for complete search history.

(56) References Cited

U.S. PATENT DOCUMENTS

| | | | | |
|---|---|---|---|---|
| 1,086,684 A | * | 2/1914 | Molesworth | 202/185.5 |
| 1,584,267 A | * | 5/1926 | Young | 165/110 |
| 1,935,183 A | * | 11/1933 | Hapgood | 202/170 |
| 2,019,011 A | * | 10/1935 | Johnson | 68/18 R |

(Continued)

FOREIGN PATENT DOCUMENTS

JP           A-54-13956           1/1979

(Continued)

OTHER PUBLICATIONS

International Preliminary Report on Patentability for PCT/JP2007/000199.*

*Primary Examiner* — Duane Smith
*Assistant Examiner* — Patrick McCarty
(74) *Attorney, Agent, or Firm* — Oliff & Berridge, PLC

(57) ABSTRACT

A spiral double-tube structure including an inner tube for introducing a solvent vapor resulting from vaporization within a distillation still and an outer tube which a coolant gas cooled by an outdoor machine is passed through is disposed in a buffer tank; the solvent vapor is directly cooled from the surrounding area by the coolant gas with a large temperature difference and thus condensed into a liquid state; by means of an ejector, the liquid is mixed with the solvent suctioned from the buffer tank and returned into the buffer tank; since the solvent in the buffer tank is also directly cooled by the coolant gas, the cooling efficiency is high; accordingly, both the solvent vapor generated from the distillation still and the solvent in the buffer tank for reducing the pressure inside the distillation still can be efficiently cooled without using cooling water, and downsizing of the apparatus can also be attained.

12 Claims, 2 Drawing Sheets

U.S. PATENT DOCUMENTS

| | | | | |
|---|---|---|---|---|
| 3,269,155 A | * | 8/1966 | Shaw | 68/18 R |
| 3,364,731 A | * | 1/1968 | Hook | 73/61.77 |
| 3,610,260 A | * | 10/1971 | Kearney | 134/12 |
| 3,976,129 A | * | 8/1976 | Silver | 165/154 |
| 4,165,360 A | * | 8/1979 | Casper et al. | 422/202 |
| 4,241,043 A | * | 12/1980 | Hetzel | 423/659 |
| 5,500,095 A | * | 3/1996 | Shinagawa et al. | 203/2 |
| 5,702,535 A | * | 12/1997 | Gray et al. | 134/10 |
| 2002/0157815 A1 | * | 10/2002 | Sutter | 165/154 |

FOREIGN PATENT DOCUMENTS

| | | |
|---|---|---|
| JP | U-60-49988 | 4/1985 |
| JP | U-60-168502 | 11/1985 |
| JP | A-6-320140 | 11/1994 |
| JP | A-7-289788 | 11/1995 |
| JP | A-8-290004 | 11/1996 |
| JP | A-2006-141546 | 6/2006 |

* cited by examiner

DISTILLATION APPARATUS

TECHNICAL FIELD

The present invention relates to a distillation apparatus for purifying a solvent used in a dry cleaner or a solvent used for cleaning various electronic components.

BACKGROUND ART

In a dry cleaning machine used in cleaners and similar establishments, a vacuum distillation apparatus for purifying a solvent is employed to reuse a solvent (silicon oil, petroleum solvent and the like) contaminated as a result of cleaning laundry. Currently, such a distillation apparatus generally uses a solvent vapor condensation method in which a spiral pipe or similar pipe having a large surface area is disposed within a container filled with a solvent vapor, and water that has been cooled by a chiller or cooling tower is passed through the pipe to condense the vapor (for example, refer to Patent Document 1). Another method uses the same system in a reverse way: the container with the spiral pipe disposed therein is filled with cool water, and a solvent vapor is passed through the pipe to condense the solvent by heat exchange. These methods both use water as a medium for the heat exchange with the solvent vapor.

Water is easy to use as a cooling medium because it is higher in heat conductivity than oil and harmless to the human body. However, it also has various problems, such as the formation of rust or scale due to a long-term use, the freezing of water in cold climates, and the cooling water's temperature being unstable due to the influence of ambient temperature in the case of a cooling tower. There are also many inconveniences relating to maintenance. Given these factors, a distillation apparatus that does not use cooling water has been strongly demanded.

The aforementioned distillation apparatus includes a buffer tank for storing the solvent. The solvent in this tank is suctioned or pressurized by a pump to be circulated through an ejector, whereby the distillation still is evacuated. Since this pump circulation causes the solvent to generate heat, it is necessary to additionally dispose a pipe within the buffer tank and pass cooling water through this pipe to cool the solvent in the buffer tank. This means that a cooling container for condensing the solvent vapor must be provided separately from the buffer tank, which impedes the downsizing of the apparatus.

To solve this problem, a distillation apparatus disclosed in Patent Document 2 has a pair of parallel spiral pipes disposed within a buffer tank filled with a solvent, with the cooling water passing through one pipe and a solvent vapor through the other; the water is intended for cooling the solvent in the buffer tank, whereas the cooled solvent acts as a coolant for the solvent vapor. This configuration is advantageous with regards to downsizing because it enables the buffer tank and the cooling container for condensation to be consolidated into a single unit and also requires only a single system of a cooling-water supply line. However, there is also the problem that the temperature of the solvent in the buffer tank is higher than that of the cooling water and hence it is difficult to ensure a large temperature difference between the solvent and the solvent vapor, which leads to inadequate cooling of the solvent vapor and inappropriate condensation thereof. Another problem is that a large capacity buffer tank is required because the solvent in the buffer tank needs to have a large heat capacity.

Patent Document 1: Japanese Unexamined Patent Application Publication No. H7-289788
Patent Document 2: Japanese Unexamined Patent Application Publication No. 2006-141546

DISCLOSURE OF THE INVENTION

Problem to be Solved by the Invention

The present invention has been developed in view of the aforementioned problems, and its first objective is to provide a distillation apparatus capable of efficiently performing the distilling operation by adequately cooling the solvent vapor without using cooling water.

The second objective of the present invention is to provide a distillation apparatus that can be downsized and yet also capable of efficiently performing the distilling operation by sufficiently condensing the solvent vapor into a liquid state.

Means for Solving the Problems

To achieve the first objective, a first aspect of the present invention provides a distillation apparatus for distilling a solvent or similar liquid to be processed, including:

a distillation still for heating to vaporize a liquid to be processed; and a heat exchanger directly cooling a vapor of the liquid to be processed extracted from the distillation still, via a wall separating the vapor and a coolant gas acting as a cooling source, in order to condense the vapor into a liquid state.

In the distillation apparatus according to the first aspect of the present invention, a coolant gas whose temperature is lowered by a so-called outdoor unit including a compressor replaces the conventional cooling water as a cooling source for condensing vapor of the liquid to be processed. The heat exchanger helps the condensation of the vapor by directly cooling the vapor by means of the coolant gas via the wall. Unlike conventional distillation apparatuses in similar categories, the present apparatus uses no water and hence is free from any harmful effect or inconvenience associated with the use of cooling water, such as the formation of rust or scale due to a long-term use and the freezing of water in cold climates. The cooling capacity depends on the performance of the outdoor unit yet is scarcely affected by the ambient temperature. The outdoor unit occupies only a small installation space as compared to the cooling tower or similar device. The coolant gas can normally be cooled to approximately 0° C. or below (within a range of approximately −20 to 0° C. in most cases), which is considerably lower than can be achieved by the cooling water. Therefore, a large temperature difference from that of the vapor of the liquid to be processed (for example, solvents used in dry cleaners are normally at 90 to 110° C.) can be achieved, which helps the vapor to be efficiently cooled and condensed into a liquid state.

In one preferable mode of the first aspect of the present invention, the distillation apparatus is designed for vacuum distillation and further includes:

a buffer tank for storing a processed liquid resulting from distillation of the liquid to be processed; and a liquid circulation passage having the inlet and outlet ends connected to the buffer tank, with a pump and an ejector both located between the two ends, the pump causing the processed liquid to circulate, and the ejector utilizing a flow of the processed liquid produced by the pump to suction a distillate resulting from devolatilization by the heat exchanger, wherein the heat exchanger is located within the buffer tank and has a wall separating the coolant gas acting as the cooling source and the vapor of the liquid to be processed and a wall separating the coolant gas and the processed liquid stored in the buffer tank.

In this mode of the distillation apparatus, the vapor resulting from the vaporization of the liquid in the distillation still is cooled at the heat exchanger due to the heat exchange with the coolant gas, to be condensed into a liquid state. The distillate resulting from this process is drawn into the liquid circulation passage by means of the ejector and returned to the buffer tank. Even if there is a liquid that has not been adequately cooled or a vapor that has not been devolatilized during the condensing process, such a liquid and vapor will be cooled or condensed when they are mixed with the processed liquid drawn from the buffer tank in the ejector. The temperature of the processed liquid returning to the buffer tank after flowing through the liquid circulation passage is higher than before. However, the returned liquid is cooled within the buffer tank by the heat exchange with the coolant gas at the heat exchanger immersed in the liquid. Therefore, the temperature of the processed liquid stored in the buffer tank will not rise.

According to the present configuration, the cooling container for cooling the liquid to be processed and the buffer tank can be consolidated into a single unit. This makes the apparatus more simply structured and more advantageous to downsizing, and also facilitates maintenance tasks. Since both the processed liquid in the buffer tank and the vapor introduced from the distillation still are directly cooled by the coolant gas via the respective walls, it is easy to ensure adequate temperature differences for both the processed liquid and the vapor to obtain a high cooling effect. Furthermore, since the heat exchanger is located within the buffer tank and immersed in the processed liquid, the cold energy of the coolant gas barely escapes to another location (e.g. into the air), so that a high level of cooling efficiency is achieved. The aforementioned positioning of the heat exchanger also makes it possible to avoid unnecessary moisture condensation or frosting without using a heat insulation material. Since the coolant gas is used to concurrently cool both the processed liquid and the vapor within the buffer tank, the gas energy can be used economically and efficiently.

In the previously described mode of the present invention, the heat exchanger may specifically be a double-tube structure including an outer tube which the coolant gas passes through and an inner tube which the vapor of the liquid to be processed passes through.

In this configuration, the inner tube is entirely surrounded by the coolant gas. Therefore, the vapor flowing through the inner tube is quite efficiently cooled. On the other hand, the outer tube is entirely surrounded by the processed liquid stored in the buffer tank. Therefore, the cold energy of the coolant gas that is not used in the heat exchange with the vapor will be mostly used in the heat exchange with the processed liquid in the buffer tank. Such an efficient use of the cold energy of the coolant gas makes it possible to increase the distillation rate so that the same amount of the liquid can be processed more quickly.

The heat transfer ratio between the process of cooling the vapor and the process of cooling the processed liquid in the buffer tank is automatically adjusted to equilibrium. Therefore, even if the process load suddenly changes due to, for example, the completion of the distillation or a change in the distillation rate, the coolant gas returning to the outdoor unit undergoes only a minor temperature change. Accordingly, it is easy to achieve thermal matching with the outdoor unit, whereby frosting or the like in the outdoor unit or on an interconnecting coolant-gas pipe is prevented. Additionally, since the coolant is not in a liquid phase when returning to the outdoor unit, the outdoor unit will not suffer undesired loads.

The heat exchanger may be a spirally-wound double-tube structure. This design makes it possible to ensure a large surface area for the heat exchange without increasing the capacity of the buffer tank and thereby improve the cooling efficiency.

In the previous configuration, a temperature detector may be provided at or near the inlet of the inner tube of the double-tube structure immersed in the processed liquid in the buffer tank.

In this configuration, the temperature detected by the temperature detector suddenly changes when, for example, the liquid to be processed starts to evaporate in the initial heating phase in the distillation still or the generation of the vapor is discontinued. Based on this temperature change, it is possible to assuredly and accurately detect the beginning or completion of the distillation. This information can be used in various control operations, such as the turning-on/off or power-switching of the outdoor unit.

To achieve the second objective, a second aspect of the present invention provides a distillation apparatus for distilling a solvent or similar liquid to be processed, including:

a distillation still for heating to vaporize a liquid to be processed; and a heat exchanger for condensing a vapor of the liquid to be processed extracted from the distillation still, the heat exchanger being formed of a double-tube structure including an inner or outer tube which the vapor of the liquid to be processed is passed through and an outer or inner tube which a cooling liquid is passed through.

The cooling liquid is typically cooling water. The heat exchanger in the distillation apparatus according to the second aspect of the present invention can be designed in a small, space-saving form yet with a large heat-exchanging area between the vapor of the liquid to be processed and the cooling liquid. Specifically, adopting a spiral double-tube structure will lead to further downsizing.

In one preferable mode of the second aspect of the present invention, the distillation apparatus further includes:

a buffer tank for storing a processed liquid resulting from distillation of the liquid to be processed; and a liquid circulation passage having the inlet and outlet ends connected to the buffer tank, with a pump and an ejector both located between the two ends, the pump causing the processed liquid to circulate, and the ejector utilizing a flow of the processed liquid produced by the pump to suction a distillate resulting from devolatilization by the heat exchanger, wherein the heat exchanger is located within the buffer tank, with the vapor of the liquid to be processed being passed through the inner tube and the cooling liquid through the outer tube.

As explained earlier, the cooling water is higher in temperature than the coolant gas, so that the temperature difference between the cooling water and the vapor of the liquid to be processed is relatively small. However, it is possible to cool the vapor of the liquid to be processed and the processed liquid in the buffer tank with the cooling water via the respective walls by configuring the heat exchanger in the form of a double-tube structure and passing the cooling water through the outer tube and the vapor through the inner tube. This method makes it easier to ensure a required temperature difference for the heat exchange with the vapor to efficiently cool the vapor and accelerate its condensation than the conventional method in which the processed liquid in the buffer tank is cooled by the cooling water and the cooled liquid in turn cools the vapor of the liquid to be processed.

Since the heat exchanger is located within the buffer tank and immersed in the processed liquid, the cold energy of the coolant gas barely escapes to another location (e.g. into the air), so that the energy can be effectively utilized for cooling both the vapor and the processed liquid in the buffer tank. Therefore, it is possible to increase the distillation rate so that the same amount of liquid can be processed more quickly.

The distillation apparatuses according to the first and second aspects of the present invention can be used for the distillation of various liquids and particularly suited for purifying a contaminated solvent resulting from an operation of a dry cleaner into a cleaned state.

EFFECT OF THE INVENTION

Thus, the distillation apparatus according to the first aspect of the present invention can efficiently cool vapor of a solvent or similar liquid without using cooling water and collect the condensed solvent in a liquid state. The disuse of water prevents the formation of rust or scale due to a long-term use, the freezing of water in cold climates and other problems and hence reduces the cost and time for the maintenance. The cooling process can always be efficiently performed with little influence from ambient temperatures, so that the distillation rate of the liquid to be processed will be improved.

The distillation apparatus according to the second aspect of the present invention can be downsized for a higher degree of installation freedom and yet efficiently perform the cooling process to improve the distillation rate of the liquid to be processed.

EXPLANATION OF NUMERALS

7 . . . Solvent Tank
30 . . . Distillation Introduction Line
31 . . . Distillation Introduction Valve
32 . . . Distillation Suction Line
33 . . . Suction Switch Valve
40 . . . Distillation Apparatus
41 . . . Distillation Still
42 . . . Heating Chamber
43 . . . Steam Supply Pipe
44 . . . Steam Regulation Valve
45 . . . Demister
46 . . . Solvent Vapor Introduction Pipe
47 . . . Bumping Detection Sensor
50 . . . Buffer Tank
51 . . . Double-Tube Structure
52 . . . Inner Tube
53 . . . Outer Tube
54 . . . Thermistor
55 . . . Outdoor Unit
56 . . . Coolant Gas Supply Pipe
57 . . . Coolant Gas Collection Pipe
58 . . . Recycled Solvent Collection Line
60 . . . Atmosphere Intake Valve
61 . . . Vacuum Meter
62 . . . Vacuum Pressure Switch
63 . . . Back-Flow Prevention Valve
64 . . . Recycled Solvent Circulation Line
65 . . . Pump
66 . . . Ejector
71 . . . Water Separator

BEST MODE FOR CARRYING OUT THE INVENTION

Figure 1:
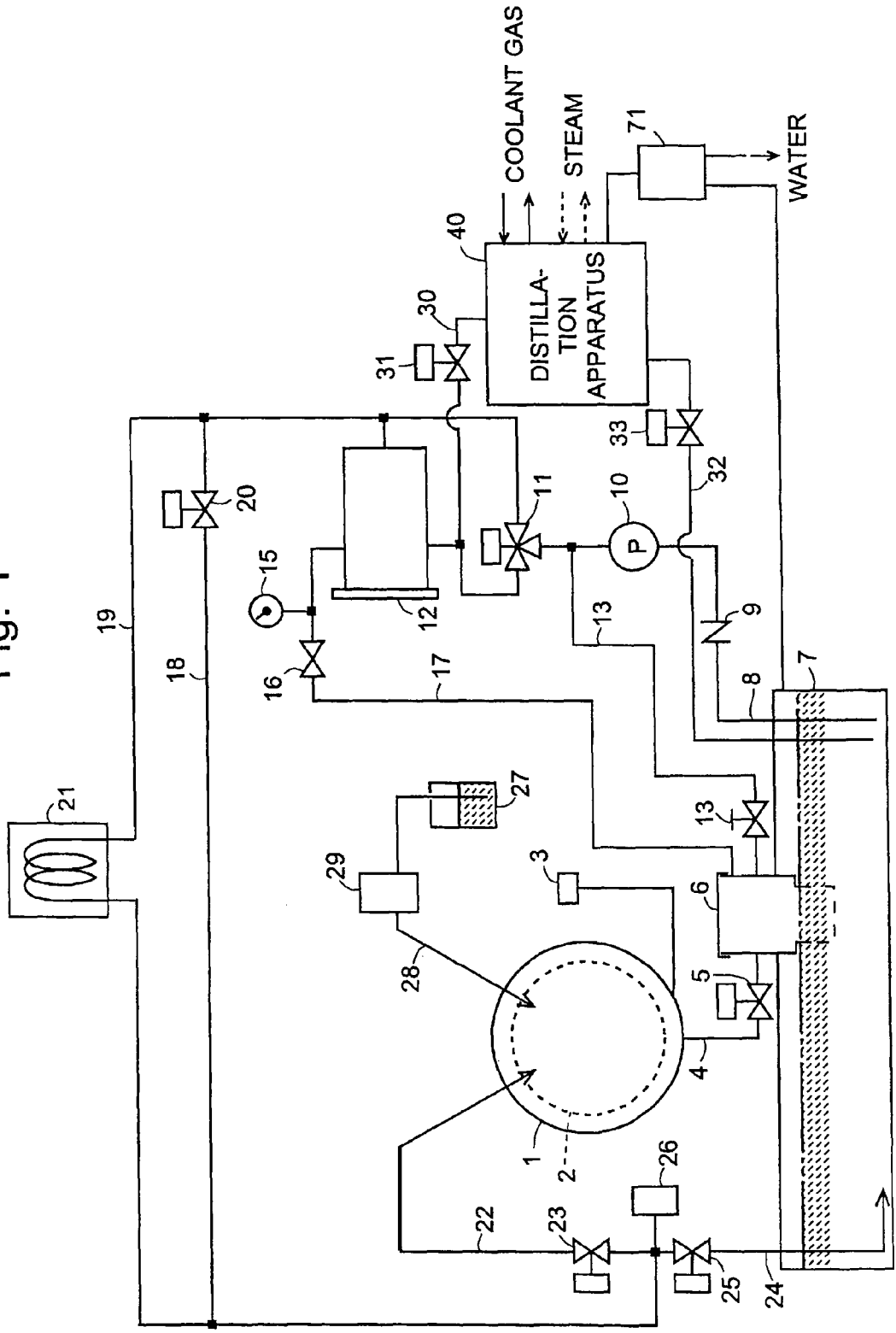
FIG. 1 is a configuration diagram showing the tube arrangement and other important components of a dry cleaner using a distillation apparatus according to an embodiment of the present invention.
Figure 2:
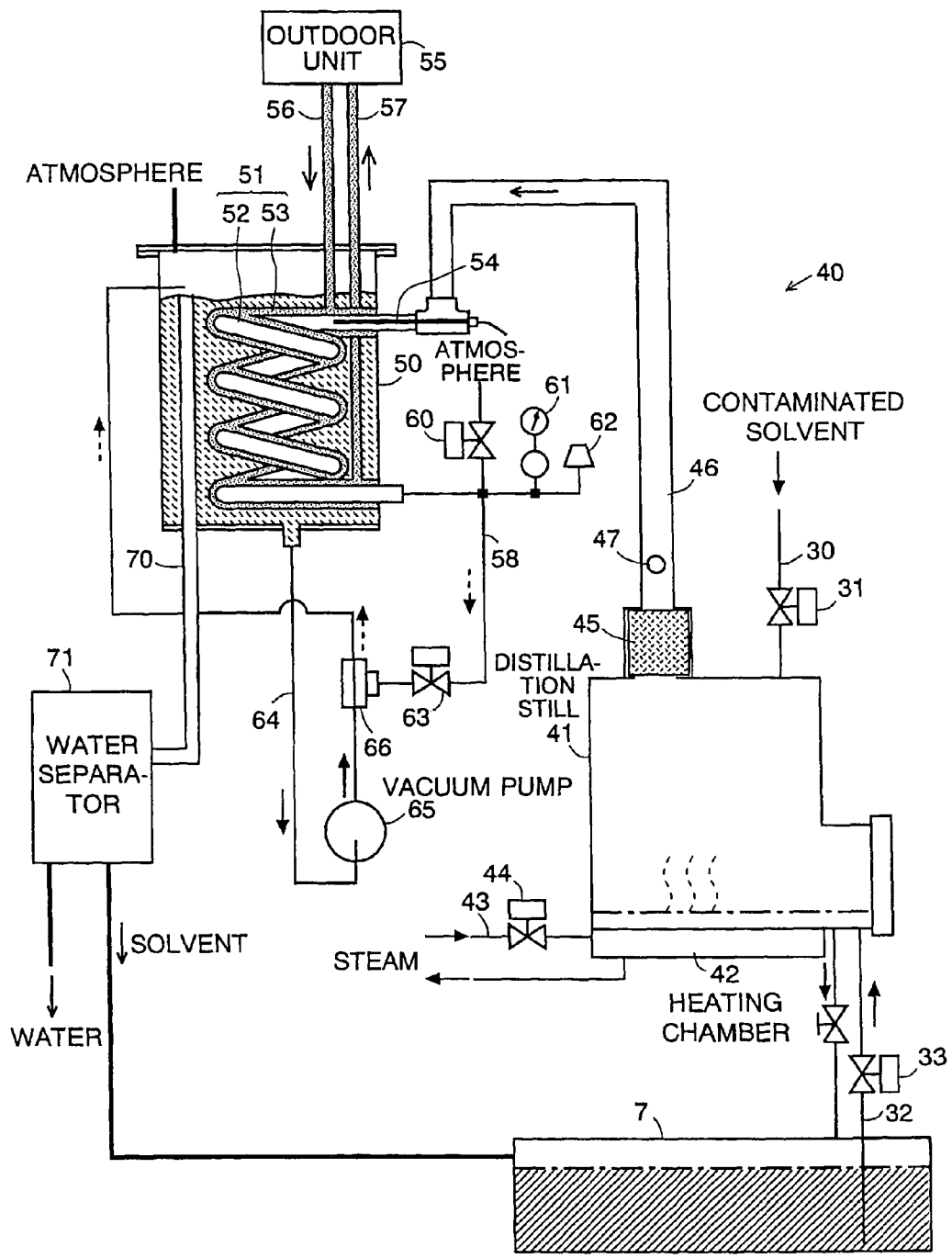
FIG. 2 is a configuration diagram showing the tube arrangement and other components of the distillation apparatus in the present embodiment.

One embodiment of the present invention, which is a distillation apparatus used in a dry cleaner, is hereinafter described with reference to FIGS. 1 and 2. FIG. 1 is a configuration diagram showing the pipe arrangement and other important components of the dry cleaner using the distillation apparatus in the present embodiment, and FIG. 2 is a configuration diagram showing the pipe arrangement and other components of the distillation apparatus in the present embodiment. The following description assumes that the liquid to be processed in the present invention is a solvent used in the cleaning operation of the dry cleaner, such as a petroleum solvent or silicon solvent.

In FIG. 1, the dry cleaner has an outer tub 1, in which a cylindrical drum 2 having a large number of liquid-passing holes formed in its circumferential wall is supported by a shaft in a free-to-rotate manner. The outer tub 1 can store a solvent, whose level can be detected by a level sensor 3. A drainage line 4 with a drain valve 5 is connected to the bottom of the outer tub 1. This line is leads to a solvent tank 7 via a button trap strainer 6. The button trap strainer 6 is a type of filter for removing relatively large solid items (e.g. a button from clothes) which may be included in a drained solvent.

The solvent tank 7 has a suction line 8 inserted therein. This line is connected via a check valve 9 to the suction port of a pump 10. The ejection port of the pump 10 is connected via a three-way valve 11 to the inlet and outlet of a solvent filter 12. The solvent filter 12 consists of a paper filter, activated carbon filter and so on, and is intended for removing impurities (e.g. fine dust) and various contaminants mixed in the solvent. The line branching from a point between the pump 10 and the three-way valve 11 is a filter drain line 13, which is connected to the button trap strainer 6 via a filter drain valve 14. The outlet of the solvent filter 12 branches into a bypass line 18 having a solvent-cooling switch valve 20 disposed therein and a solvent-cooling line 19 passing through a solvent cooler 21. These lines 18 and 19 are merged into a liquid supply line 22 having a liquid supply valve 23 disposed therein. This line is connected to the outer tub 1. A return line 24, which branches from a point before the liquid supply valve 23, is provided with a tank circulation valve 25. The outlet end of the return line 24 is connected to the solvent tank 7.

The upper portion of the solvent filter 12 and that of the button trap strainer 6 are interconnected by an air release line 17, in which an air release valve 16 and pressure gauge 15 are provided. Additionally, one end of a soap injection line 28 having a soap injector 29 disposed therein is connected to the outer tub 1. The other end of the same line is connected to a soap container 27. A soap concentration sensor 26 for detecting the soap concentration of the solvent is attached to the branching point of the liquid supply line 22 and the return line 24.

For the purpose of distilling the solvent, a distillation introduction valve 31 is provided in a distillation introduction line 30 branching from the inlet of the solvent filter 12. The distillation introduction line 30 is connected to a distillation apparatus 40. A distillation suction line 32, one end of which is inserted into the solvent in the solvent tank 7, is also connected to the distillation apparatus 40 via a suction switch valve 33. The distillated solvent extracted from the distillation apparatus 40 is introduced into a water separator 71, which produces a water-free solvent and returns it to the solvent tank 7.

In the dry cleaning apparatus of the present embodiment having the previously described configuration, when the laundry contained in the drum 2 is to be cleaned, a liquid supply passage is formed as follows to supply the solvent from the solvent tank 7 into the outer tub 1: The drain valve 5 and tank circulation valve 25 are closed, the liquid supply valve 23 is opened, and the pump 10 is energized. The solvent-cooling switch valve 20 is appropriately turned on and off according to the solvent temperature detected by a temperature sensor (not shown) so that a portion of the solvent will be directed into the solvent-cooling line 19 in order to cool the entire solvent. As a result, the solvent stored in the solvent tank 7 is suctioned by the pump 10 through the suction line 8 and supplied into the outer tub 1 by way of the solvent filter 12, either the bypass line 18 or solvent-cooling line 19, and the liquid supply line 22. When the solvent passes through the solvent filter 12, the contaminants and fine foreign matters mixed in the solvent are removed.

The solvent is supplied from the solvent tank 7 into the outer tub 1 until it is confirmed from the level sensor 3 that a predetermined amount of the solvent has been stored in the outer tub 1. With the solvent stored to a predetermined level in the outer tub 1, the drum 2 is rotated to clean the laundry. The cleaning operation may be a batch process in which the drain valve 5 is closed, as described earlier, to perform the operation with the same solvent stored in the outer tub 1. Alternatively, it is possible to open the drain valve 5 and perform the cleaning while continuing the supply of the solvent through the liquid supply passage.

During the cleaning operation, soap is supplied from the soap injector 29 to appropriately maintain the soap concentration for improving the cleaning performance and also preventing electrification. Relatively large foreign matter, such as lint or dirt that comes off the laundry during the cleaning operation, will be trapped by the button trap strainer 6 when the drain valve 5 is opened and the solvent returns from the outer tub 1 to the solvent tank 7 through the drainage line 4.

On the other hand, in the process of removing contaminants from the solvent stored in the solvent tank 7, a solvent circulation passage is formed as follows. The liquid supply valve 23 is closed, the tank circulation valve 25 is opened, and the pump 10 is energized. The solvent-cooling switch valve 20 is appropriately turned on and off according to the solvent temperature detected by a temperature sensor (not shown) so that a portion of the solvent will be directed into the solvent-cooling line 19 in order to cool the entire solvent. As a result, the solvent stored in the solvent tank 7 is suctioned by the pump 10 through the suction line 8 and later returns to the solvent tank 7 by way of the solvent filter 12, either the bypass line 18 or solvent-cooling line 19, and the return line 24. When the solvent passes through the solvent filter 12, the contaminants and fine foreign matter mixed in the solvent are removed. The temperature of the solvent is appropriately controlled due to the cooling action of the solvent cooler 21.

The solvent filter 12 can remove most of the contaminants in the solvent but cannot remove water and fine contaminants that can pass through the filter. Given this problem, the solvent is further purified by distillation so as to reuse it in a clean state. In the process of distilling the solvent, the distillation introduction valve 31 is opened so that the solvent suctioned by the pump 10 from the solvent tank 7 is sent through the distillation introduction line 30 to the distillation apparatus 40. Another method of introducing the solvent into the distillation apparatus 40 is to open the suction switch valve 33 during a vacuum distillation (which will be described later), whereupon the solvent will be siphoned from the solvent tank 7 into the distillation still maintained in the vacuum state. The solvent that has been vaporized, condensed, cooled and collected by the distillation apparatus 40 contains water. This water is removed by the water separator 71, and only the solvent is returned to the solvent tank 7. Therefore, it is possible to purify the entire solvent in the solvent tank 7 by continuing the distillation process for a predetermined period of time.

The configuration and operation of the distillation apparatus is hereinafter detailed based on FIG. 2. The distillation introduction line 30 having the distillation introduction valve 31 is connected to a hermetically sealable distillation still 41. Located at the bottom of the distillation still 41 is a heating chamber 42, which can be heated by steam supplied through a steam supply pipe 43. A solvent vapor (which corresponds to the "vapor of the liquid to be processed" in the present invention) thermally produced by vaporization within the distillation still 41 passes through a demister 45 and reaches the heat exchanger via a solvent vapor introduction pipe 46. Within the solvent vapor introduction pipe 46, a bumping detection sensor 47 for detecting the bumping of the solvent is provided. When bumping is detected, the heating power is lowered, for example, by controlling the degree of opening of a steam regulation valve 44.

A feature of the distillation apparatus in the present embodiment exists in the configuration of the heat exchanger, which has a double-tube structure 51 consisting of a spiral double tube including a cylindrical inner tube 52 and a cylindrical outer tube 53. This double-tube structure 51 is located within a buffer tank 50 in which the solvent is to be stored. In a steady state, the double-tube structure 51 is entirely immersed in the solvent stored in the buffer tank 50. The solvent vapor introduction pipe 46 is connected to the upper end of the inner tube 52 of the double-tube structure 51 outside the buffer tank 50, and a hot solvent vapor (at approximately 90 to 110° C.) is introduced into the inner tube 52. On the other hand, the two ends of the outer tube 53 of the double-tube structure 51 inside the buffer tank 50 are respectively connected to a coolant gas supply pipe 56 and coolant gas collection pipe 57 so that a low-temperature coolant gas (at approximately −20 to 0° C.) is produced, for example, by an outdoor unit 55 outside the room is supplied through the coolant gas supply pipe 56 into the outer tube 53 and then returned to the outdoor unit 55 via the coolant gas collection pipe 57.

As will be explained later, the solvent becomes condensed into a liquid state when it passes through the inner tube 52 of the double-tube structure 51. The condensed solvent is introduced into an ejector 66 via a recycled solvent collection line 58 having a back-flow prevention valve 63. A thermistor 54, which detects the temperature within the inner tube 52, is installed in such a manner that it extends from the connection point of the solvent vapor introduction pipe 46 and the inner tube 52 of the double-tube structure 51 toward the inside of the buffer tank 50. An atmosphere intake valve 60 for drawing air, a vacuum meter 61 and a vacuum pressure switch 62 are connected to the recycled solvent collection line 58 at a point upstream from the back-flow prevention valve 63.

The ejector 66, together with a pump 65, is inserted in a recycled solvent circulation line 64 having the inlet and outlet ends both connected to the buffer tank 50. When the pump 65 is energized, the solvent is forcefully circulated through the recycled solvent circulation line 64 in the direction indicated by the arrows in FIG. 2. This flow creates negative pressure at the ejector 66, whereby the solvent fresh from distillation and condensation is drawn from the recycled solvent collection line 58 into the recycled solvent circulation line 64. This drawing action causes the solvent vapor in the solvent vapor introduction pipe 46 to be drawn into the inner tube 52 of the double-tube structure 51 and also the distillation still 41 to be evacuated to a reduced pressure. Due to this pressure reduction, the solvent in the solvent tank 7 is siphoned through the distillation suction line 32 into the distillation still 41, as described earlier.

The recycled solvent passing through the recycled solvent collection line 58 is fresh from condensation and hence has a relatively high temperature. This temperature is lowered when the fresh solvent is mixed through the ejector 66 into a solvent already existing in the recycled solvent circulation line 64. Meanwhile, the solvent existing in the recycled solvent circulation line 64 receives heat from the recycled solvent as just described and also from the pump 65 and other components. Therefore, the solvent has a higher temperature when it returns to the buffer tank 50. However, since the solvent in the buffer tank 50 is cooled by the coolant gas flowing through the outer tube 53 of the double-tube structure 51, the temperature of the entire solvent stabilizes at a certain level. The addition of the recycled solvent resulting from the distillation increases the level of the solvent in the buffer tank 50. The portion of the solvent that has exceeded the upper opening of a solvent overflow line 70 flows from the buffer tank 50 to the water separator 71, which separates water from the solvent and sends a water-free solvent to the solvent tank 7. Thus, a solvent having a relatively stabilized temperature is returned to the solvent tank 7.

In the double-tube structure 51, a high-temperature solvent vapor is passed through the inner tube 52, which is surrounded by a flow of low-temperature coolant gas via a wall separating the inner and outer tubes 52 and 53. Such a large temperature difference causes an efficient heat exchange, whereby the solvent gas is efficiently cooled to be condensed into a liquid state. On the other hand, the outer tube 53 of the double-tube structure 51 is entirely surrounded by the solvent via a wall. Therefore, the coolant gas in the outer tube 53 also efficiently performs a heat exchange with the surrounding solvent, whereby the solvent in the buffer tank 50 is efficiently cooled to lower temperatures. The coolant gas passing through the outer tube 53 is always in thermal contact with either the solvent or solvent vapor via a wall. When the solvent vapor is not yet supplied or the amount of the supplied solvent vapor is small, a larger percentage of the cold energy of the coolant gas is allotted to the process of cooling the solvent in the buffer tank 50. Therefore, the cold energy will never be wasted.

That is to say, the solvent in the buffer tank 50 functions like a thermal buffer having a certain heat capacity and maintains a roughly constant rate of depriving the coolant gas passing through the outer tube 53 of the cold energy, thus preventing major fluctuations in the temperature of the coolant gas returning to the outdoor unit 55. This makes it easier to achieve thermal matching in the outdoor unit 55 to prevent frosting or other phenomena that would arise when an excessive amount of cold energy was present in the outdoor unit 55. The solvent in the buffer tank 50 also functions like a thermal insulator, so that it is unnecessary to take measures against moisture condensation and frosting, such as winding an insulating member, except for the coolant gas supply pipe 56 and some other components.

The portion whose temperature is detected by the thermistor 54 corresponds to the inlet of the cooling section of the solvent vapor. Therefore, the detected temperature is low, for example, when there is no solvent vapor generated in the distillation still 41, and then the temperature suddenly rises when a hot solvent vapor arrives. Conversely, the detected temperature suddenly falls if the generation of the solvent vapor in the distillation still 41 is halted or the amount of vapor is sharply reduced. Thus, the change in the temperature almost instantaneously follows the beginning and completion of the distillation (i.e. generation of the solvent vapor). Based on the detected temperature, it is possible to regulate the cooling power of the outdoor unit 55 or the like to reduce wasteful power consumption and lower the running costs for the distillation.

In the previous embodiment, a coolant gas was passed through the outer tube 53 of the double-tube structure 51. Alternatively, cooling water may be passed to cool both the solvent vapor and the solvent in the buffer tank 50. Although the cooling water is higher in temperature than the coolant gas and hence inferior to the coolant gas in terms of the cooling effect, the configuration in the previous embodiment can provide an adequately great temperature difference as compared to the conventional systems. Using the cooling water in this fashion is convenient in the case where an existing device and pipe system capable of supplying cooling water (e.g. a cooling tower or chiller) should preferably be utilized in their original forms.

The previous embodiment is merely an example of the present invention, and any changes, modifications or additions appropriately made within the spirit of the present invention will evidently be covered by the claims of this patent application. For example, the present invention is applicable to not only a dry cleaner as in the previous embodiment but also various apparatuses in other technical fields, such as a system for collecting and reusing a solvent used for cleaning semiconductor devices or other electrical components. The liquid to be distilled (or processed) is not limited to solvents but may be alcohol or other kinds of liquids.

The invention claimed is:

1. A distillation apparatus for distilling a liquid to be processed, comprising:
   a distillation still for heating to vaporize the liquid to be processed; and
   a heat exchanger directly cooling a vapor of the liquid to be processed extracted from the distillation still, via a wall separating the vapor and a coolant gas acting as a cooling source, in order to condense the vapor into a liquid state;
   a buffer tank for storing a processed liquid resulting from distillation of the liquid to be processed; and
   a liquid circulation passage having inlet and outlet ends connected to the buffer tank, with a pump and an ejector both located between the two ends, the pump causing the processed liquid to circulate, and the ejector utilizing a flow of the processed liquid produced by the pump to suction a distillate resulting from devolatilization by the heat exchanger,
   wherein the heat exchanger is located within the buffer tank and further includes a wall separating the coolant gas and the processed liquid stored in the buffer tank.

2. The distillation apparatus according to claim 1, wherein the heat exchanger has a double-tube structure including an outer tube which the coolant gas passes through and an inner tube which the vapor of the liquid to be processed passes through.

3. The distillation apparatus according to claim 2, wherein the heat exchanger is a spirally-wound double-tube structure.

4. The distillation apparatus according to claim 2, wherein a temperature detector is provided at or near an inlet of the inner tube of the double-tube structure immersed in the processed liquid in the buffer tank.

5. A distillation apparatus for distilling a liquid to be processed, comprising:
- a distillation still for heating to vaporize the liquid to be processed; and
- a heat exchanger for condensing a vapor of the liquid to be processed extracted from the distillation still, the heat exchanger being formed of a double-tube structure including an inner or outer tube which the vapor of the liquid to be processed is passed through and an outer or inner tube which a cooling liquid is passed through;
- a buffer tank for storing a processed liquid resulting from distillation of the liquid to be processed; and
- a liquid circulation passage having inlet and outlet ends connected to the buffer tank, with a pump and an ejector both located between the two ends, the pump causing the processed liquid to circulate, and the ejector utilizing a flow of the processed liquid produced by the pump to suction a distillate resulting from devolatilization by the heat exchanger,
- wherein the heat exchanger is located within the buffer tank.

6. The distillation apparatus according to claim 5, further comprising:
- wherein the heat exchanger is configured so that the vapor of the liquid to be processed is passed through the inner tube and the cooling liquid is passed through the outer tube.

7. The distillation apparatus according to claim 1, wherein the liquid to be processed is a solvent used in a dry cleaner, and the distillation apparatus is intended for purifying a contaminated solvent resulting from an operation of the dry cleaner into a cleaned state.

8. The distillation apparatus according to claim 2, wherein the liquid to be processed is a solvent used in a dry cleaner, and the distillation apparatus is intended for purifying a contaminated solvent resulting from an operation of the dry cleaner into a cleaned state.

9. The distillation apparatus according to claim 3, wherein the liquid to be processed is a solvent used in a dry cleaner, and the distillation apparatus is intended for purifying a contaminated solvent resulting from an operation of the dry cleaner into a cleaned state.

10. The distillation apparatus according to claim 4, wherein the liquid to be processed is a solvent used in a dry cleaner, and the distillation apparatus is intended for purifying a contaminated solvent resulting from an operation of the dry cleaner into a cleaned state.

11. The distillation apparatus according to claim 5, wherein the liquid to be processed is a solvent used in a dry cleaner, and the distillation apparatus is intended for purifying a contaminated solvent resulting from an operation of the dry cleaner into a cleaned state.

12. The distillation apparatus according to claim 6, wherein the liquid to be processed is a solvent used in a dry cleaner, and the distillation apparatus is intended for purifying a contaminated solvent resulting from an operation of the dry cleaner into a cleaned state.

* * * * *